(12) United States Patent
Faramarzi et al.

(10) Patent No.: US 9,774,865 B2
(45) Date of Patent: Sep. 26, 2017

(54) METHOD FOR REAL-TIME IMPLEMENTATION OF SUPER RESOLUTION

(71) Applicant: Samsung Electronics Co., Ltd., Suwon-si, Gyeonggi-do (KR)

(72) Inventors: Esmaeil Faramarzi, Richardson, TX (US); Felix Carlos Fernandes, Plano, TX (US); Kyungmo Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 193 days.

(21) Appl. No.: 14/567,517

(22) Filed: Dec. 11, 2014

(65) Prior Publication Data

US 2015/0172726 A1 Jun. 18, 2015

Related U.S. Application Data

(60) Provisional application No. 61/916,698, filed on Dec. 16, 2013, provisional application No. 62/006,716, (Continued)

(51) Int. Cl.
| | |
|---|---|
| H04N 7/18 | (2006.01) |
| H04N 19/137 | (2014.01) |
| G06T 3/40 | (2006.01) |
| G06T 5/00 | (2006.01) |
| H04N 19/513 | (2014.01) |

(Continued)

(52) U.S. Cl.
CPC ......... *H04N 19/137* (2014.11); *G06T 3/4053* (2013.01); *G06T 5/002* (2013.01); *G06T 5/003* (2013.01); *H04N 19/117* (2014.11); *H04N 19/132* (2014.11); *H04N 19/182* (2014.11); *H04N 19/513* (2014.11); *H04N 19/59* (2014.11); *H04N 19/85* (2014.11); *G06T 2207/10016* (2013.01); *G06T 2207/20201* (2013.01)

(58) Field of Classification Search
CPC ............................. H04N 13/00; H04N 13/021
USPC ..................... 348/40–62; 375/240.11–240.29
See application file for complete search history.

(56) References Cited

U.S. PATENT DOCUMENTS

| | | | |
|---|---|---|---|
| 6,628,715 B1 | 9/2003 | Iu et al. | |
| 9,025,894 B2 * | 5/2015 | Venkataraman | .......... G06T 9/00 |
| | | | 382/233 |

(Continued)

OTHER PUBLICATIONS

Int'l Search Report of the International Searching Authority, dated Mar. 12, 2015, in connection with Int'l. Application No. PCT/KR2014/012397, 3 pages.

(Continued)

*Primary Examiner* — Andy Rao

(57) ABSTRACT

A method for real-time multi-frame super resolution (SR) of video content is provided. The method includes receiving a bitstream including an encoded video, motion metadata for a plurality of blocks of a frame of video content, and parameters. The motion metadata is estimated from the original video before downsampling and encoding. The motion metadata is averaged over consecutive blocks. The method includes upscaling the motion metadata for the plurality of blocks. The method also includes upscaling the decoded video using the upscaled motion metadata. The method also includes deblurring and denoising the upscaled video.

20 Claims, 6 Drawing Sheets

Related U.S. Application Data filed on Jun. 2, 2014, provisional application No. 62/053,614, filed on Sep. 22, 2014.

(51) Int. Cl.
*H04N 19/117* (2014.01)
*H04N 19/132* (2014.01)
*H04N 19/182* (2014.01)
*H04N 19/85* (2014.01)
*H04N 19/59* (2014.01)

(56) References Cited

U.S. PATENT DOCUMENTS

| | | | |
|---|---|---|---|
| 9,041,819 B2* | 5/2015 | Wang | H04N 13/0022 348/208.3 |
| 2010/0054338 A1 | 3/2010 | Suzuki et al. | |
| 2011/0268179 A1 | 11/2011 | Diggins et al. | |
| 2012/0294369 A1 | 11/2012 | Bhagavathy et al. | |
| 2013/0163676 A1 | 6/2013 | Zhang et al. | |

OTHER PUBLICATIONS

Written Opinion of the Int'l Searching Authority, dated Mar. 12, 2015 in connection with Int'l Application No. PCT/KR2014/012397, 8 pages.

* cited by examiner

METHOD FOR REAL-TIME IMPLEMENTATION OF SUPER RESOLUTION

CROSS-REFERENCE TO RELATED APPLICATION(S) AND CLAIM OF PRIORITY

The present application claims priority to U.S. Provisional Patent Application Ser. No. 61/916,698, filed Dec. 16, 2013, entitled "METHOD FOR REAL-TIME IMPLEMENTATION OF SUPER RESOLUTION". The present application claims priority to U.S. Provisional Patent Application Ser. No. 62/006,716, filed Jun. 2, 2014, entitled "METHOD FOR REAL-TIME IMPLEMENTATION OF SUPER RESOLUTION". The present application claims priority to U.S. Provisional Patent Application Ser. No. 62/053,614, filed Sep. 22, 2014, entitled "METHOD FOR REAL-TIME IMPLEMENTATION OF SUPER RESOLUTION". The content of the above-identified patent documents are incorporated herein by reference.

TECHNICAL FIELD

The present application relates generally to video quality improvement.

BACKGROUND

Image Super-Resolution (SR) is the process of reconstructing a High-Resolution (HR) image from one or a series of Low-Resolution (LR) images degraded by various artifacts such as aliasing, blurring, noise, and compression error. Video SR, by contrast, is the process of reconstructing a HR video from one or more LR videos in order to increase the spatial and/or temporal resolution(s). The spatial resolution of an imaging system depends on the spatial density of the detector (sensor) array and the point spread function (PSF) of the lens (optics). The temporal resolution, on the other hand, is influenced by the frame rate and exposure time of the camera. Spatial aliasing appears in images or video frames when the cut-off frequency of the detector is lower than that of the lens. Temporal aliasing happens in video sequences when the frame rate of the camera is not high enough to capture high frequencies caused by fast-moving objects. The blur in the captured images and videos is the overall effect of different sources such as defocus, motion blur, optical blur, and detector's blur induced by light integration within the active area of each detector in the array.

SUMMARY

In a first embodiment, a method of increasing resolution using a real-time super-resolution (SR) technique is provided. The method includes receiving a bitstream including an encoded video sequence and metadata. The metadata includes motion metadata for a plurality of blocks of a frame of video content and processing parameters. The motion metadata is estimated from an original video before downsampling and encoding. The motion metadata is downsampled by averaging over consecutive blocks. The method also includes upscaling the motion metadata for the plurality of blocks. The method further includes upscaling the decoded video with the help of upscaled motion metadata. The method includes deblurring and denoising the upscaled video. In a second embodiment, a method of increasing resolution using a real-time super-resolution (SR) technique is provided. The method includes receiving a bitstream including an encoded video sequence and metadata. The metadata includes motion metadata for a plurality of blocks of a frame of video content and processing parameters. The motion metadata is estimated from an original video before downsampling and encoding. The motion metadata is downsampled by averaging over consecutive blocks. The method also includes upscaling the motion metadata for the plurality of blocks. The method further includes upscaling the decoded video using the upscaled motion metadata.

In a third embodiment, a super-resolution processor (SR) for real-time super resolution of video content is provided. The SR processor is configured to receive a decoded video sequence and motion metadata for a plurality of blocks of a frame of video content. The motion metadata is extracted from the video before encoding and downsampling. The motion metadata is averaged over consecutive blocks. The SR processor is also configured to upscale the motion metadata for the plurality of blocks. The SR processor is further configured to implement a real-time super-resolution technique comprising upscaling the decoded video using the upscaled motion metadata and subsequently deblurring and denoising the upscaled video.

In a fourth embodiment, super-resolution (SR) processor for real-time super resolution of video content is provided. The SR processor is configured to receive a decoded video sequence and motion metadata for a plurality of blocks of a frame of video content. The motion metadata is extracted from the video before encoding and downsampling. The motion metadata is averaged over consecutive blocks.

In a fifth embodiment, a system for real-time super-resolution (SR) of video content is provided. The system includes a first device. The first device is configured to transmit a bitstream including an encoded video sequence and metadata. The metadata includes motion metadata for a plurality of blocks of a frame of video content and parameters. The motion metadata is estimated from an original video before downsampling and encoding. The motion metadata is downsampled over consecutive blocks before embedding into the bitstream. The downsampled motion metadata of the plurality of blocks assumes that motion is almost fixed within each block. The system also includes a second device. The second device is configured to receive the bitstream including the encoded video sequence, the motion metadata for the plurality of blocks of a frame of video content, and the parameters. The second device is also configured to upscale the motion metadata for the plurality of blocks. The second device is further configured to upscale the decoded video using the motion metadata for the plurality of blocks.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
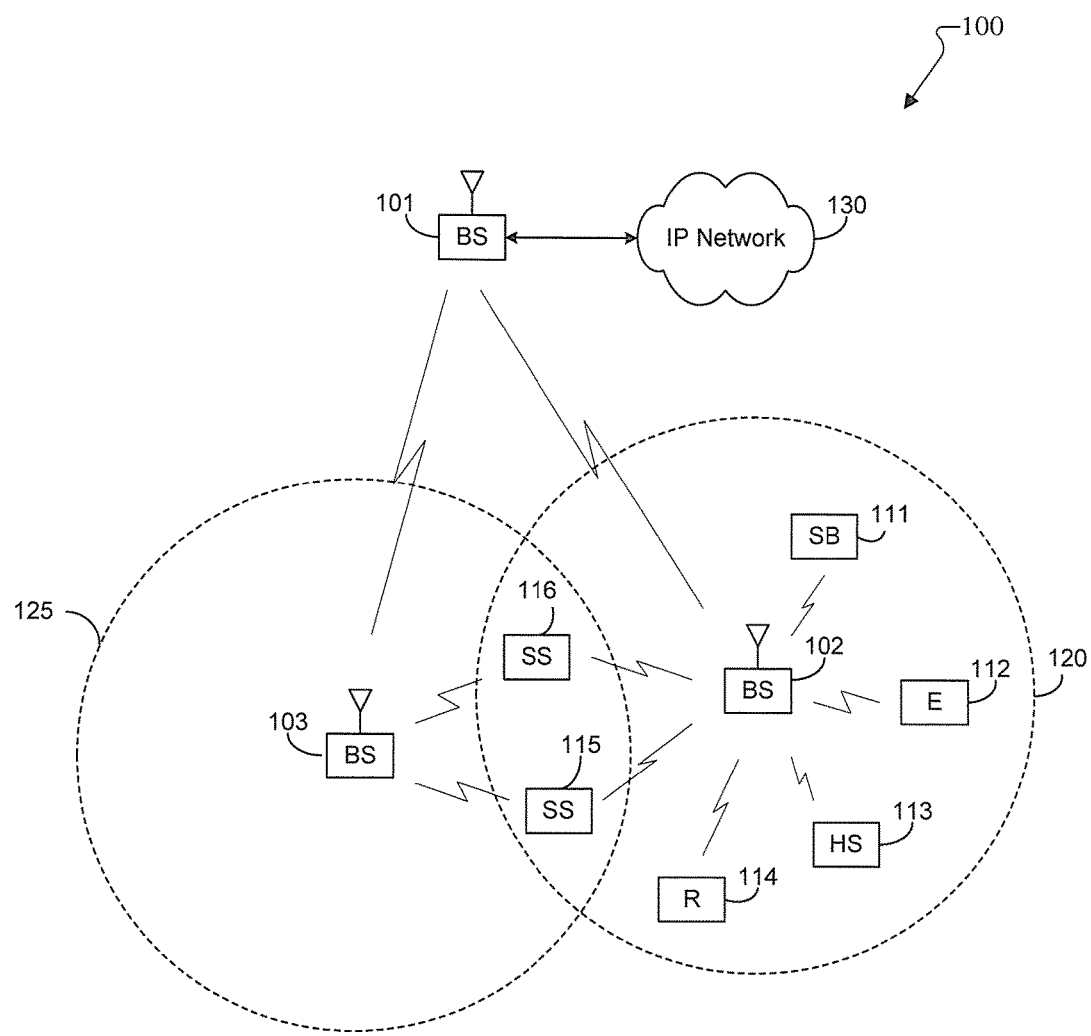
FIG. 1 illustrates an example wireless network according to this disclosure.

FIGS. 1 through 7, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

The following documents and standards descriptions are hereby incorporated into the present disclosure as if fully set forth herein: E. Faramarzi, "Blind Deconvolution and Super-resolution of Low-resolution Images and Videos," PhD dissertation, December 2012 (REF 1); E. Shechtman, Y. Caspi, and M. Irani, "Space-time super-resolution," Pattern Analysis and Machine Intelligence, IEEE Transactions on, vol. 27, no. 4, pp. 531-545, April 2005 (REF 2); S. Borman and R. Stevenson, "Super-resolution from image sequences—A review," in Proceedings of the 1998 Midwest Symposium on Circuits and Systems. Notre Dame, Ind., USA: IEEE, August 1998, pp. 374-378 (REF 3); S. C. Park, M. K. Park, and M. G. Kang, "Super-resolution image reconstruction: a technical overview," Signal Processing Magazine, IEEE, vol. 20, no. 3, pp. 21-36, May 2003 (REF 4); Y. Caspi and M. Irani, "Spatio-temporal alignment of sequences," IEEE Transactions on Pattern Analysis and Machine Intelligence, vol. 24, pp. 1409-1424, 2002 (REF 5); B. K. Gunturk, Y. Altunbasak, and R. Mersereau, "Super-Resolution Reconstruction of Compressed Video Using Transform-Domain Statistics," IEEE Trans. on Image Proc., vol. 13, no. 1, January 2004 (REF 6); R. R. Schultz and R. L. Stevenson, "A Bayesian approach to image expansion for improved definition," IEEE Trans. On Image Proc., vol. 3, pp. 233-242, March 1994 (REF 7); Segall, C. A.; Katsaggelos, A. K.; Molina, R.; Mateos, J., "Bayesian resolution enhancement of compressed video," IEEE Trans. on Image Proc., vol. 13, no. 7, pp. 898-911, July 2004 (REF 8); Y. Yang and N. P. Galatsanos, "Removal of compression artifacts using projections onto convex sets and line process modeling," IEEE Trans. On Image Proc., vol. 6, pp. 1345-1357, October 1998 (REF 9); Molina, R., A. K. Katsaggelos, L. D. Alvarez, and J. Mateos. "Toward a new video compression scheme using super-resolution." In Electronic Imaging 2006, pp. 607706-607706. International Society for Optics and Photonics, 2006 (REF 10); Weinzaepfel, Philippe, Hervé Jégou, and Patrick Pérez. "Reconstructing an image from its local descriptors." In Computer Vision and Pattern Recognition (CVPR), 2011 IEEE Conference on, pp. 337-344. IEEE, 2011 (REF 11); Daneshi, Maryam, and Jiaqi Guo. "Image Reconstruction based on Local feature Descriptors," Course Project, Stanford University (REF 12); Ajay Luthra, Jill Boyce, Jens-Rainer Ohm, Jörn Ostermann. "Use cases for the scalable enhancement of HEVC," ISO/IEC JTC1/SC29/WG11 M2448, April 2012, Geneva, Switzerland (REF 13); F. Fernandes, E. Faramarzi, M. Asif, Z. Ma. "Method and System for Providing Super-Resolution of Quantized Images and Videos"; M. Elad and Y. Hel-Or, "A fast super-resolution reconstruction algorithm for pure translational motion and common space-invariant blur," IEEE Trans. Image Process., vol. 10, no. 8, pp. 1187-1193, August 2001 (REF 15); Felix C. A. Fernandes, S. Asif, Esmaeil Faramarzi, and Z. Ma, "A Method for Super-Resolution of Lossy Compressed Images and Video", Samsung Research America, December 2012 (REF 16); and Sroubek, F.; Milanfar, P., "Robust Multichannel Blind Deconvolution via Fast Alternating Minimization," IEEE Transactions on Image Processing, vol. 21, no. 4, pp. 1687, 1700, April 2012 (REF 17).

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, method and systems are provided for increasing spatial and temporal resolutions of video content using a real-time super-resolution (SR) technique. Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
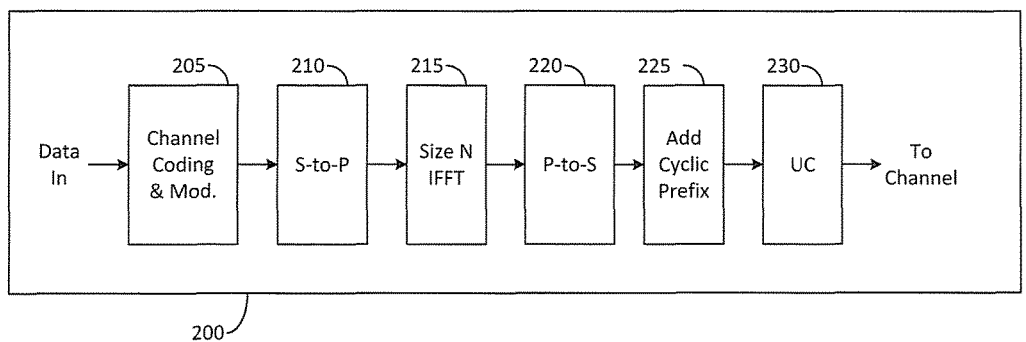
FIGS. 2A and 2B illustrate example wireless transmit and receive paths according to this disclosure.
Figure 2B:
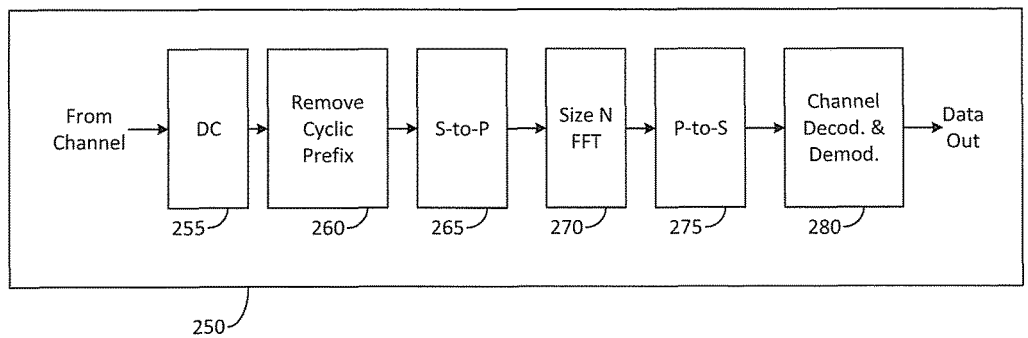

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to increase the spatial or temporal resolutions of video content using a real-time super-resolution (SR) technique.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
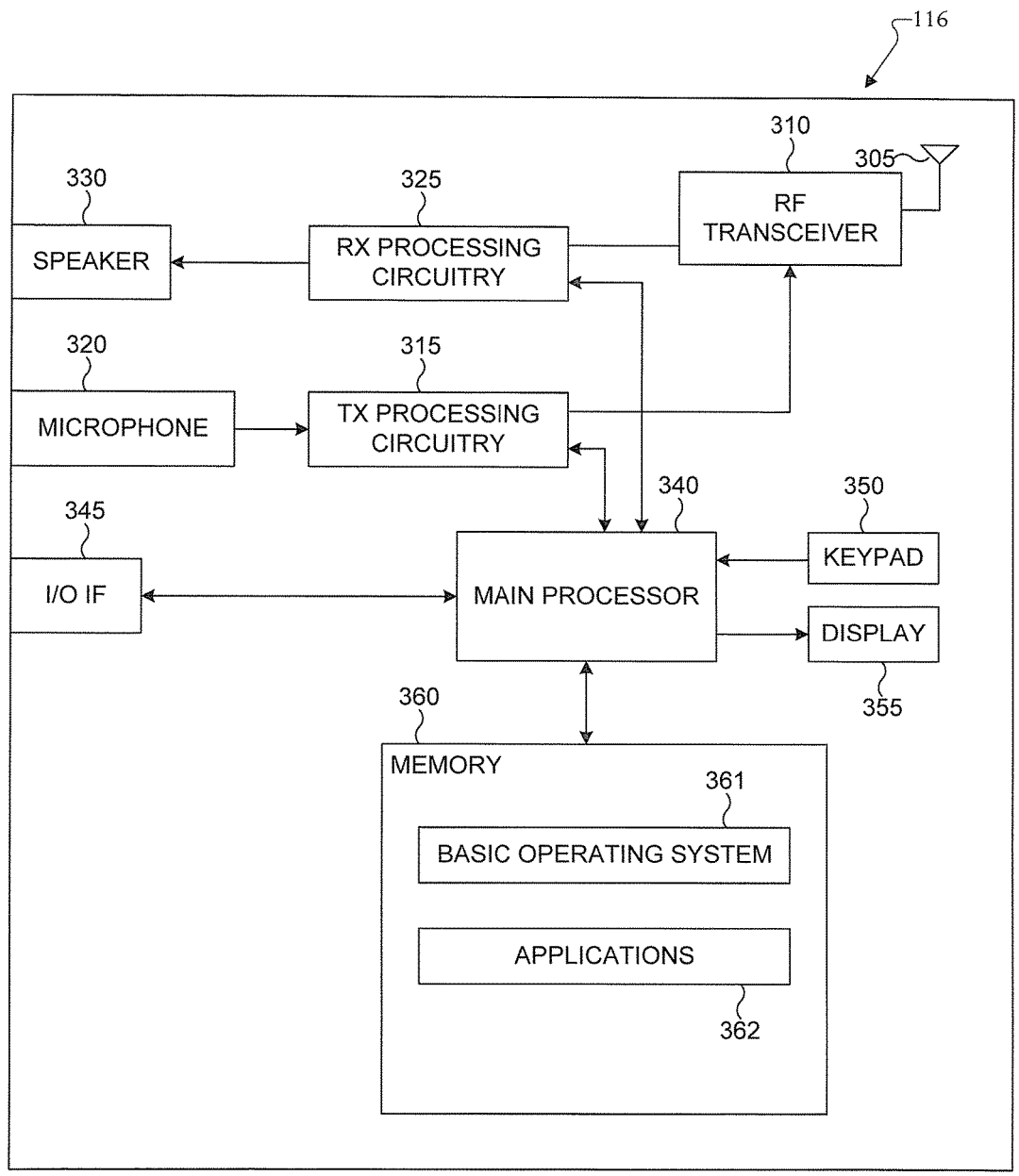
FIG. 3 illustrates an example user equipment according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for increasing spatial or temporal resolutions of video content using a real-time super-resolution (SR) technique. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Image Super-Resolution (SR) is the process of reconstructing a High-Resolution (HR) image from one or a series of Low-Resolution (LR) images degraded by various artifacts, such as aliasing, blurring, noise, and compression error. Video SR, by contrast, is the process of reconstructing a HR video from one or more LR videos in order to increase the spatial resolution, the temporal resolution, or both.

The spatial resolution of an imaging system depends on the spatial density of the detector (that is, the sensor) array and the point spread function (PSF) of the lens (namely, the optics). Alternatively, the temporal resolution is influenced by the frame rate and exposure time of the camera. Spatial aliasing appears in images, or in video frames, when the cut-off frequency of the detector is lower than the cut-off frequency of the lens. Temporal aliasing occurs in video sequences when the frame rate of the camera is not high enough to capture high frequencies caused by fast-moving objects. The blur in the captured images and videos is the overall effect of different sources, such as defocus, motion blur, optical blur, and detector's blur induced by light integration within the active area of each detector in the array (See also REF1 and REF2).

There are four types of SR systems: Single-Image SR (SISR), Multiple-Image SR (MISR), Single-Video SR (SVSR), and Multiple-Video SR (MVSR). SISR techniques are referenced as learning-based, patch-based or example-based SR in which the basic idea is to replace small spatial patches (a patch is a group of pixels) within a LR image by similar patches of higher resolution extracted from either the image itself or other images. Many of these techniques require an offline training phase to reconstruct a database of HR patches and their corresponding LR patches, as shown in FIG. 4.

Figure 4:
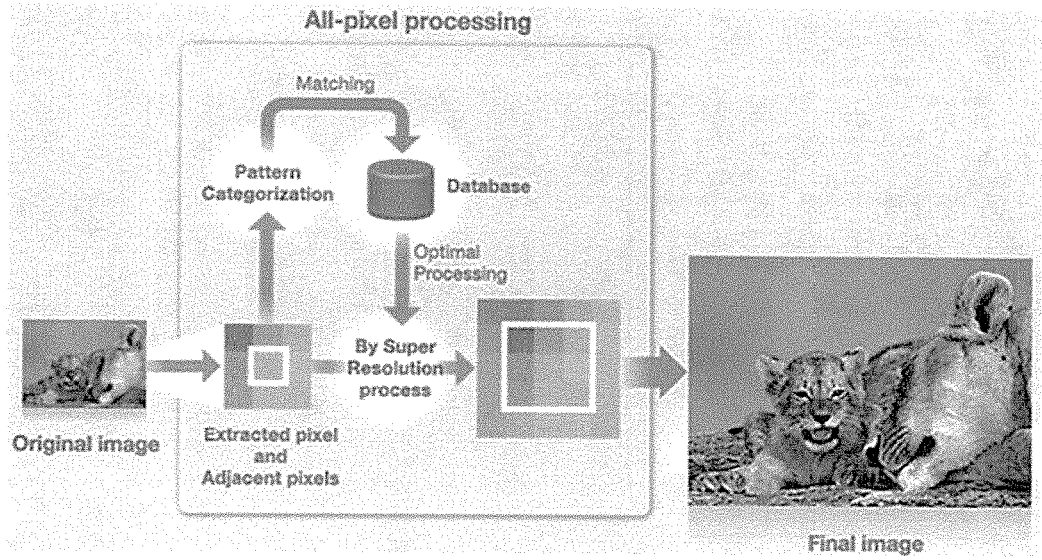
FIG. 4 illustrates an example Single-Image Super-Resolution (SISR) technique according to this disclosure.

FIG. 4 illustrates an example SISR technique according to this disclosure. The embodiment of the SISR technique shown in FIG. 4 is for illustration only. Other embodiments of the SIRS technique could be used without departing from the scope of this disclosure.

Figure 5:
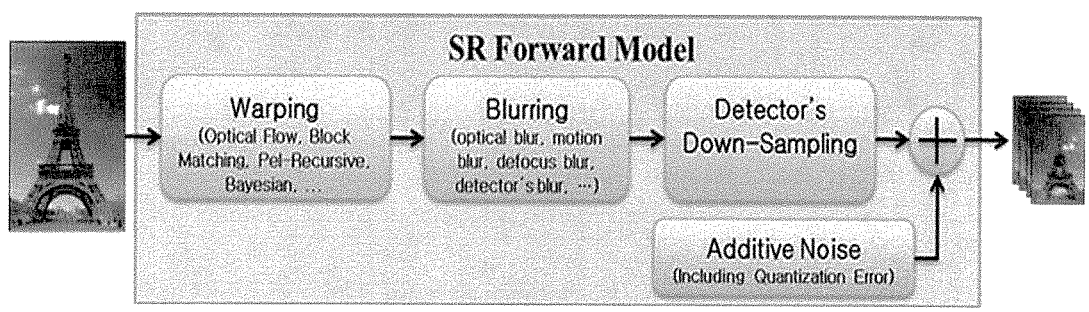
FIG. 5 illustrates an example forward model for a typical Multi-Image Super-Resolution (MISR) system according to this disclosure.

MISR is the most common type of image SR method, which leverages the information from multiple input images to reconstruct the output HR image. The most common MISR approaches are: 1) Frequency-Domain (FD) approach; 2) Non-Uniform Interpolation (NUI) approach; 3) Cost-Function Minimization (CFM) approach; and 4) Projection Onto Convex Sets (POCS) approach (See also REF1, REF3 and REF4). FIG. 5 illustrates an example forward model for a typical MISR system according to this disclosure. In practice, the system is completely blind, for example, so that all parameters of the system (such as motion (warping) vectors, blurring filters, noise characteristics, or the like) are unknown and estimated along with the output HR image. The embodiment of the forward model for a typical MISR system shown in FIG. 5 is for illustration only. Other embodiments of the forward model for a typical MISR system could be used without departing from the scope of this disclosure.

SVSR methods are a generalization of either the SISR or the MISR methods for the case of video sequences. The former case (type I) includes a justification that small space-time patches within a video are repeated many times inside the same video or other videos at multiple spatiotemporal scales. In the latter case (type II), the spatial resolution is increased by combining each video frame with a few of its neighboring frames, or the temporal resolution is increased by estimating some intermediate frames between each two adjacent frames. For example, SISR and SVSR-type I can be SFSR (single-frame SR), and MISR and SVSR-type II can be MFSR (multi-frame SR).

MVSR methods are recent SR techniques with some unique characteristics such as 1) no need for complex "inter-frame" alignments, 2) the potential of combining different space-time inputs, 3) the feasibility of producing different space-time outputs, and 4) the possibility of handling severe motion aliasing and motion blur without the need of doing motion segmentation (See also REF1, REF2 and REF5). The 4D space-time motion parameters are estimated between the video sequences. All proposed MVSR methods include a case where the spatial displacement is a 2D homography transformation and the temporal misalignment is a 1D affine transformation.

Figure 6A:
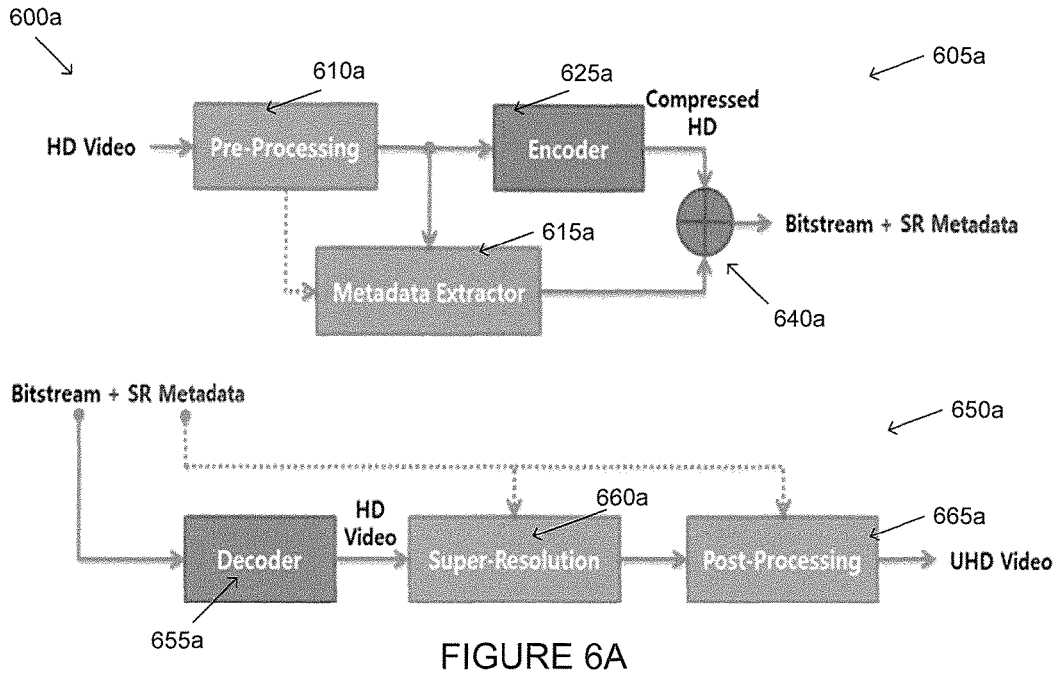
FIGS. 6A and 6B illustrate example systems to improve super-resolution performance according to this disclosure.
Figure 6B:
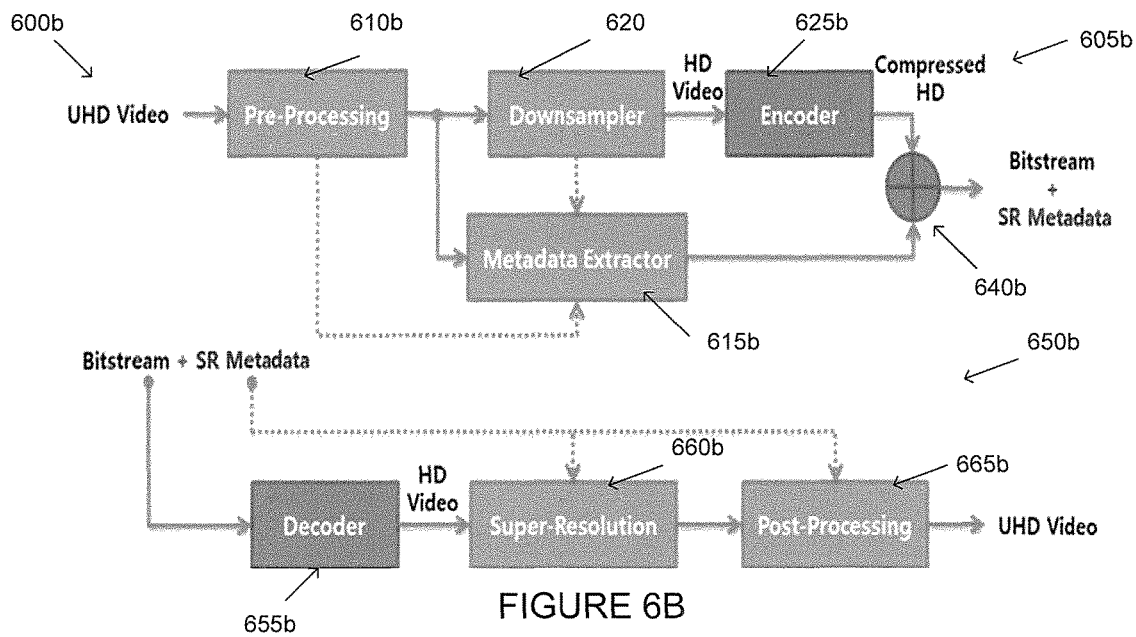

To overcome the suboptimal performance of super resolution on down-sampled content or on content with lossy compression artifacts, metadata is extracted from the original content and used to improve super-resolution performance (See also REF14) as shown in FIGS. 6A and 6B.

FIGS. 6A and 6B illustrate example systems to improve super-resolution performance according to this disclosure. The embodiments of the systems shown in FIGS. 6A and 6B are for illustration only. Other embodiments of these example systems could be used without departing from the scope of this disclosure.

FIG. 6A illustrates a system 600a for generating a high-resolution video stream from a low-resolution video stream using the super-resolution according to this disclosure. The system 600a shown in FIG. 6A is for illustration only. A system for generating a high-resolution video stream from a low-resolution video stream can be configured in any other suitable manner without departing from the scope of this disclosure.

As used herein, "high-resolution" and "low-resolution" are terms used relative to each other. Thus, a "high-resolution" video stream refers to any suitable video stream having a higher resolution than a video stream referred to as a "low-resolution" video stream. Thus, for a particular example, when a high-resolution video stream comprises an ultra-high-definition video stream, a low-resolution video may comprise a high-definition video stream.

The illustrated system 600a includes a video-encoding system 605a and a video-decoding system 650a. The video-encoding system 605a includes an encoder 625a, a metadata extractor 615a, a pre-processing block 610a and a combiner 640a. The video-decoding system 650a includes a decoder 655a, a super-resolution processor 660a and a post-processing block 665a.

For the illustrated embodiment, the pre-processing block 610a is configured to receive as an input a low-resolution video, to perform pre-processing on the video, and to provide the processed video to the encoder 625a and the metadata extractor 615a. The pre-processing block 610a is also configured to provide the pre-processed low-resolution video to the metadata extractor 615a.

The encoder 625a is configured to encode the low-resolution video by encoding the video to generate an encoded, low-resolution video. The metadata extractor 615a is configured to extract metadata from the pre-processed low-resolution video for use in performing super-resolution and some post-processing operations. The combiner 640a is configured to embed the metadata into the encoded video bitstream (e.g. as a SEI message) to generate an output for the image-encoding system 605a. Thus, the output comprises a bitstream that includes the encoded, low-resolution video, along with the metadata estimated by the metadata extractor 615a.

The video-decoding system 650a is configured to receive the output from the video-encoding system 605a. The video-decoding system 650a can comprise a component configured to extract the super-resolution metadata and the post-processing parameters from the bitstream. The decoder 655a is configured to decode the compressed, low-resolution video in the bitstream to generate a decoded, low-resolution video. The super-resolution processor 660a is configured to receive the decoded, low-resolution video and the SR metadata and to perform super-resolution on the decoded, low-resolution video with the help of the SR metadata to generate a super-resolved video. The post-processing block 665a is configured to perform post-processing on the super-resolved video to generate a more enhanced video as an output of the video-decoding system 650a. Thus, the resolution of the output of the video-decoding system 650a is a higher resolution than that of the video input to the video-encoding system 605a. In this way, the resolution of the encoded video is significantly improved without significant increasing the bitrate of the bitstream transmitted from the video-encoding system 605a to the video-decoding system 650a considering that the size of metadata is negligible compared to the size of the encoded video.

Although FIG. 6A illustrates one example of a system 600a for generating a high-resolution video stream from a low-resolution video stream, various changes can be made to FIG. 6A. For example, the makeup and arrangement of the system 600a are for illustration only. Components could be added, omitted, combined, subdivided, or placed in any other suitable configuration according to particular needs.

FIG. 6B illustrates a system 600b for processing a high-resolution video stream using the super-resolution process according to this disclosure. The system 600b shown in FIG. 6B is for illustration only. A system for processing a high-resolution video stream can be configured in any other suitable manner without departing from the scope of this disclosure.

The illustrated system 600b includes a video-encoding system 605b and a video-decoding system 650b. The video-encoding system 605b includes an encoder 625b, a metadata extractor 615b, a pre-processing block 610b, a downsampler 620 and a combiner 640b. The video-decoding system 650b includes a decoder 655b, a super-resolution processor 660b and a post-processing block 665b.

For the illustrated embodiment, the pre-processing block 610b is configured to receive as an input a high-resolution video, to perform pre-processing on the video, and to provide the processed video to the downsampler 620 and the metadata extractor 615b. The pre-processing block 610b is also configured to provide the pre-processing parameters to the metadata extractor 615b.

The downsampler 620 is configured to downsample the processed video to generate a low-resolution video and to provide the low-resolution video to the encoder 625b. For some embodiments, the downsampler 620 can also be configured to provide downsampling information to the metadata extractor 615b corresponding to the processed video. For example, the downsampling information can comprise a spatial downsampling ratio, a temporal downsampling ratio, a downsampling filter or the like. In an embodiment, a downsampler can be located downstream from the metadata extractor 615b to reduce the size of metadata and enable simplification of the SR process for real time processing. This is made by the assumption that motion metadata is almost fixed within small image blocks.

The encoder 625b is configured to encode the low-resolution video to generate a video bitstream. The metadata extractor 615b is configured to extract metadata from the original uncompressed high-resolution video for use in performing super-resolution. For some embodiments, the metadata extractor 615b can include downsampling information from the downsampler 620 in the metadata. The combiner 640b is configured to embed the super-resolution metadata into the video bitstream (e.g. as a SEI message) to generate an output for the video-encoding system 605b. Thus, the output comprises a bitstream that includes the encoded low-resolution video, along with the encoded super-resolution and post-processing metadata extracted by the metadata extractor 615b.

The video-decoding system 650b is configured to receive the output from the video-encoding system 605b. The video-decoding system 650b can include a component configured to extract the super-resolution metadata from the bitstream. The decoder 655b is configured to decode the compressed low-resolution video to generate a decoded video. The super-resolution processor 660b is configured to receive the decoded video and the SR metadata and to perform super-resolution on the decoded video with the help of the SR metadata to generate a super-resolved video.

For embodiments in which the downsampler 620 provides downsampling information to the metadata extractor 615b for inclusion with the metadata, the super-resolution processor 660b can be configured to upsample the decoded video to its original spatial size by using a spatial upsampling ratio equal to the spatial downsampling ratio in the downsampler 620, to up-convert the decoded video to its original frame rate by using a temporal upsampling ratio equal to the temporal downsampling ratio in the downsampler 620, to use an upsampling filter proportional to the downsampling filter in the downsampler 620 to improve the operations of super-resolution and video coding, or for any other suitable super-resolution process based on the downsampling information included in the SR metadata. In an embodiment, an upsampler can be positioned upstream from the super-resolution processor 660b and can upsample the super-resolution metadata before the super-resolution metadata reaches the super-resolution processor 660b.

The super-resolution processor 660b is configured to upscale the decoded video transmitted from the decoder 655b through combining each frame with multiple neighboring frames using motion metadata. The super-resolution processor is also configured to deblur and denoise the decoded video transmitted from the decoder 655b. The SR metadata transmitted to the super-resolution processor 660b is averaged over image blocks of a small size by assuming that motion is almost fixed within each block. This enables simplifying the SR reconstruction process by an order of magnitude. Subsequently the super-resolution processor 660b transmits the super-resolved video to the post-processing block 665b.

The post-processing block 665b is configured to perform post-processing on the super-resolved video to apply some other enhancements to the super-resolved video. Thus, the resolution of the output of the video-decoding system 650b is intended to be equivalent to the resolution of the video input to the video-encoding system 605b. In this way, the bitrate of the bitstream transmitted from the video-encoding system 605b to the video-decoding system 650b is significantly reduced without downgrading the video quality.

Although FIG. 6B illustrates one example of a system 600b for processing a high-resolution video stream, various changes may be made to FIG. 6B. For example, the makeup and arrangement of the system 600b are for illustration only. Components could be added, omitted, combined, subdivided, or placed in any other suitable configuration according to particular needs.

With SR, it can be difficult to attain good performance in realistic scenarios, and SR's high computational complexity can prevent real-time processing in many applications. In certain embodiments, useful and small information can be extracted from an original uncompressed video and added as metadata to the compressed bitstream. After decoding the bitstream, the metadata can be used to help the operation of the super-resolution block. In certain embodiments, dense optical-flow (OF) motion information can be used for metadata. The storage size of dense OF metadata is considerably less than the video itself (such as 10% of the size of input downsampled video). Furthermore, the OF metadata can be down-sampled without so much degradation in the SR performance. Table 1 shown below illustrates how an SR performance for a video sequence is affected when applying different down-sampling ratios to the optical flow metadata.

TABLE 1

| | DSR = 1 | DSR = 2 | DSR = 4 | DSR = 8 | DSR = 16 | DSR = 32 |
|---|---|---|---|---|---|---|
| Metadata size (for 100 frames) | 78.2 KB | 22.7 KB | 10.7 KB | 7.3 KB | 5.7 KB | 5.1 KB |
| PSNR for SR | 29.5 dB | 29.2 dB | 28.9 dB | 28.4 dB | 27.9 dB | 27 dB |

Down-sampling reduces the metadata compression size, without significantly reducing an obtained PSNR using SR even for a highly complex video such as a video which includes many structures in different resolutions. Table 1 illustrates a metadata size and super-resolution PSNR for 100 frames of a video sequence that is down-sampled by 4. The metadata is compressed using x264 codec of FFmpeg package.

Accordingly, a fast video SR method that can be implemented to enable real-time processing. For example, by accepting some levels of sub-optimality, the optimization problem can be reformulated either non-iteratively or using fewer iterations. Because optical flow can be down-sampled or averaged over blocks, the computational complexity of SR can be reduced to enable real-time implementation. For example, an accurate formulation is simplified at different levels of sub-optimality while assuming that the motion is fixed over image blocks of some size.

In MFSR methods, each frame is combined with a few of its neighboring frames within a temporal window of size 2 m+1 (m frames forward and m frames backward). The linear forward imaging model which illustrates the process of generating a low-resolution (LR) frame from a reference high-resolution (HR) frame is defined in the Matrix-vector notation as shown in Equation (1):

$$g_i = DH_i M_{ik} f_k + n_i, i \in [k-m, k+m], k=1 \text{ to } n \quad (1)$$

where $g_i$ is the ith frame of the input LR video, $f_k$ is the kth frame of the unknown HR video, D is the spatiotemporal down-sampling operator, $H_i$ is the blurring operator, $M_{ik}$ is the relative motion between the reference frame k and frame i, and $n_i$ is the noise vector.

SR methods can be based on a miniaturization of a well-defined cost function. This approach is called cost function minimization (CFM). An example cost function is according to Equation (2):

$$J(f) = \sum_{k=1}^{n} (\sum_{i=k-m}^{k+m} \|O_{ik}(g_i - DH_i M_{ik} f_k)\|_p^p + \lambda_k \sum_{j=1}^{P} \|B_j f_k\|_q^q) \quad (2)$$

where $\|\cdot\|_p$ and $\|\cdot\|_q$ are norm types (e.g. norm-1, norm-2, . . . ), which are defined for a vector x of length n as $\|x\|_p = (\sum_{i=1}^{n} \|x_i\|^p)^{1/p}$ (TV norm has a different definition), $O_{ik}$ is a diagonal matrix with diagonal values of either 0 or 1 to mask the pixels for which the estimated motion is not accurate, and $B_j$s are high-pass filtering kernels. The first term in Equation (2) is called the fidelity term which is the norm of error between the observed and synthesized LR frames. While in most works the L2 norm is used for the fidelity term (p=2), a robust norm (such as "1") results in less sensitivity to outliers and motion estimation errors. The second term in Equation (2) is the regularization term to bind the reconstructed HR frame as a smooth or piece-wise smooth function.

Computing the derivative of the above cost function using lagged diffusivity fixed-point (FP) iterative scheme results in the following linear equation at the nth "outer" iteration according to Equation (3):

$$(\sum_{i=k-m}^{k+m} M_{ik}^T H_i^T D^T O_{ik} V_{ik}^{(n)} DH_i M_{ik} + \lambda_k^n \sum_{j=1}^{P} B_j^T W_{jk}^{(n)} B_j) f_k^{(n)} = \sum_{i=k-m}^{k+m} M_{ik}^T H_i^T D^T O_{ik} V^{(n)} g_i \quad (3)$$

where the superscript T indicates the transpose operation and the matrices $V_{ik}^{(n)}$ and $W_{ik}^{(n)}$ are defined as in Equation (4):

$$V_{ik}^n = \text{diag}[(g_i - DH_i M_{ik} f_k^{(n-1)})^{p-2}], W_{jk}^n = \text{diag}[(B_j f_k^{(n-1)})^{q-2}] \quad (4)$$

In equation (4), the power terms p−2 and q−2 are applied component-wise. In each outer iteration, a few "inner" iterations are performed to solve the equation set in Equation (3) as explained below.

The sequential motion fields (such as motion between each frame and its previous one) are computed from the original uncompressed video and are embed into the encoded bit-stream as metadata as show in FIGS. 6A and 6B. After decoding, the first estimate $f_k^{(0)}$ is computed using a single image up-sampling (such as bilinear, bi-cubic, or the like) or an NUI SR method. Subsequently, to central motion conversion (central motion means the motion between each reference frame and one neighboring frame) is sequentially applied. Then $V_{ik}^{(1)}$ and $W_{jk}^{(1)}$ from equation (4) are computed. After $V_{ik}^{(1)}$ and $W_{jk}^{(1)}$ from equation (4) are computed, then $f_k^{(1)}$ from equation (3) is computed using an iterative method such as steepest descent (SD) or conjugate gradient (CG).

The steps of computing $V_{ik}^{(1)}$ and $W_{jk}^{(1)}$ from Equation (4) and subsequently computing $f_k^{(1)}$ from Equation (3) can be repeated a few times to first compute $V_{ik}^{(n)}$ and $W_{jk}^{(n)}$ from $f_k^{(n-1)}$ and then to obtain $f_k^{(n)}$ using $V_{ik}^{(n)}$ and $W_{jk}^{(n)}$. This formulation can provide accurate reconstruction results for SR, but can also have a high computational complexity for real-time scenarios. In an embodiment, this formulation can be simplified using some degrees of sub-optimality.

In the SR optimization process, each pixel is only influenced by those neighboring pixels that fall inside the blur support centered on that pixel. Therefore, video frames can be divided into overlapping blocks larger than the blur size for SR processing. It can be assumed that the optical flow motion to be fixed in each block provides that the motion is global and purely translational inside the block. The outcome is that all motion operator block matrices $M_{ik}^b$ (the superscript b indicates block) are block circulant. Moreover, when the blur function is assumed linear space-invariant (LSI) and periodic boundary condition is assumed, the matrices $H_i$ in equation (1) is block circulant with circulant blocks (BCCB) (See also REF1 and REF15). Exploiting the fact that block-circulant matrices commute [18], we get $H_i M_{ik}^b = M_{ik}^b H_i$. Therefore, equation (1) can be written as Equation (5):

$$g_i^b = DM_{ik}^b z_k^b + n_i, z_k^b = H f_k^b \quad (5)$$

This modification allows for a separation of a fusing (such as up-sampling) process of an SR from the deblurring process.

A general cost function to compute each up-sampled frame $z_k^b$ from its neighboring frames $g_i^b$'s is written as Equation (6):

$$J(z_k^b) = \sum_{k=1}^{n} (\sum_{i=k-m}^{k+m} \|O_{ik}(g_i^b - DM_{ik}^b z_k^b)\|_p^p + \lambda_k \sum_{j=1}^{P} \|B_j z_k^b\|_q^q) \quad (6)$$

To make the computation of each pixel in $z_k^b$ exclusively based on one pixel in $g_i^b$ and reduce the computational cost, the filters $B_j$'s can be omitted from the regularization term, which results in:

$$J(z_k^b) = \sum_{k=1}^{n} \left( \sum_{i=k-m}^{k+m} \|O_{ik}(g_i^b - DM_{ik}^b z_k^b)\|_p^p + \lambda_k \|z_k^b\|_q^q \right), \quad (1)$$

where the regularization term in Equation (1) now penalizes the total energy of the block. Using the FP iterative scheme to minimize Equation (1) with respect to $z_k^b$, the following linear equation set is achieved:

$$(\sum_{i=k-m}^{k+m} M_{ik}^{b^T} D^T O_{ik} V_{ik}^{(n)} DM_{ik}^b + \lambda_k^n W_k^{(n)}) z_k^b = \sum_{i=k-m}^{k+m} M_{ik}^{b^T} D^T O_{ik} V^{(n)} f_i \quad (8)$$

where $V_{ik}{}^n = \text{diag}[(g_i - DM_{ik}{}^b z_k{}^{b(n-1)})^{p-2}]$ and $W_k{}^n = (z_k{}^{b(n-1)})^{q-2}$. The right hand side (RHS) vector in Equation (8) is an image with the same size as $z_k{}^b$. Moreover, the term inside the parentheses on the left hand side (LHS) is a diagonal matrix. The reason is that on one hand, $O_{ik}$ and $V_{ik}{}^{(n)}$ are themselves diagonal matrices and, alternatively, since the filtering operations H and $B_j$ are absent in this term, there is no interaction between pixels. Therefore, the LHS matrix only applies some weighting or masking operations on each pixel. Because of the diagonal property, the inverse of the matrix can be computed by just inversing the diagonal elements. Thus, the pixel values can be computed directly without performing inner iterations (such as by using an iterative method such as PCG) and only a few outer iterations are required to update $V_{ik}$ and $W_{jk}$. Equation (8) can be further simplified by Equation (9):

$$M_{ik}^T D^T O_{ik} V_{ik}^{(n)} D M_{ik} z_k^{b(n)} = [M_{ik}^T D^T (o_{ik} \cdot v_{ik}^{(n)})] z_k^{b(n)} \qquad (9)$$

$$W_k^{(n)} z_k^{b(n)} = w_k^{(n)} \cdot z_k^{b(n)} \qquad (10)$$

where $o_{ik} = \text{diag}(O_{ik})$, $v_{ik}^{(n)} = \text{diag}(V_{ik}^{(n)})$, $w_k^{(n)} = \text{diag}(W_k^{(n)})$ and the dot operators indicate pixel-wise multiplication. Applying Equation (9) and Equation (10) to Equation (8), results in Equation (11):

$$z_k^{b(n)}(x, y) = \frac{\left[\sum_{i=k-m}^{k+m} M_{ik}^{bT} D^T O_{ik} V^{(n)} g_i\right](x, y)}{\left[\sum_{i=k-m}^{k+m} M_{ik}^{bT} D^T O_{ik} \cdot v_{ik}^{(n)} + \lambda_k^n w_k^{(n)}\right](x, y)} \qquad (11)$$

where x and y denote pixel coordinates. Equation (11) is the first level of simplification achieved in which the inner iterative process is replaced with a one-step pixel-wise operation and only some outer iterations are used.

To make the up-sampling process fully non-iterative, norm-2 can be used for both the fidelity and the regularization terms. In this case, $V^{(n)}$ and $W_k^{(n)}$ become identity matrices and so $z_k{}^b$ cab be computed directly with no outer iterations as:

$$z_k^b(x, y) = \frac{\left[\sum_{i=k-m}^{k+m} M_{ik}^{bT} D^T O_{ik} g_i\right](x, y)}{\left[\sum_{i=k-m}^{k+m} M_{ik}^{bT} D^T O_{ik} \cdot v_{ik}^{(n)} + \lambda_k^n \bar{1}\right](x, y)} \qquad (12)$$

where $\bar{1}$ in Equation (12) is the all-one vector. Equation (12) is the second simplification level in which no inner or outer iterations are used.

Eventually, the simplest form is obtained by assuming $\lambda_k^n = 0$ and $o_{ik} = \bar{1}$ (or $O_{ik} = I$ where I is the identity matrix):

$$z_k^b(x, y) = \frac{\left[\sum_{i=k-m}^{k+m} M_{ik}^{bT} D^T g_i\right](x, y)}{\left[\sum_{i=k-m}^{k+m} M_{ik}^{bT} D^T \bar{1}\right](x, y)}, \qquad (13)$$

Going from Equation (11) to Equation (12) and then to Equation (13), both the complexity and the performance of SR are reduced. After obtaining the up-sampled blocks $z_k{}^b$, the whole frame $z_k$ is constructed by sticking the blocks together and properly handling the overlapping area.

The next step is applying a deblurring operation to $z_k$ to obtain $f_k$. This can be done for example by a CFM method that minimizes the cost function as show in Equation (14).

$$J(f) = \Sigma_{k=1}{}^n(\|z_k - H_k f_k\|_p{}^p + \lambda_k \Sigma_{j=1}{}^p \|B_j f_k\|_q{}^q) \qquad (14)$$

This cost function can be solved using an iterative scheme such as fixed point (FP), augmented Lagrangian approach with split-Bregman iterations (See also REF16), or the like. In case of using the $L_2$ norm for both fidelity and regularization terms, Equation (14) can be solved only in one step by applying the Fourier transform in Equation 15 (See also REF1):

$$f_k(x, y) = \mathcal{F}^{-1}\left(\frac{\overline{\mathcal{F}(h)} \cdot \mathcal{F}(z_k)}{|\mathcal{F}(h)|^2 + \lambda_k |\mathcal{F}(b_1)|^2 + \lambda_k |\mathcal{F}(b_2)|^2}\right) \qquad (15)$$

The systems and methods discussed herein can be used for televisions with ultra-high definition (UHD) resolutions (4 k×2 k or 8 k×4 k). Because most available contents have lower resolutions than UHD, however the systems and method discussed herein can upscaling the contents with lower resolutions into UHD so that UHD televisions can display the content with UHD resolution. Furthermore, the systems and methods discussed herein can be used for mobile devices. Due to the limited bandwidth, stream UHD videos to mobile devices can be slow and costly. Instead videos can be streamed to a mobile device in HD resolution and then SR is used to upscale the contents into UHD resolution.

Figure 7:
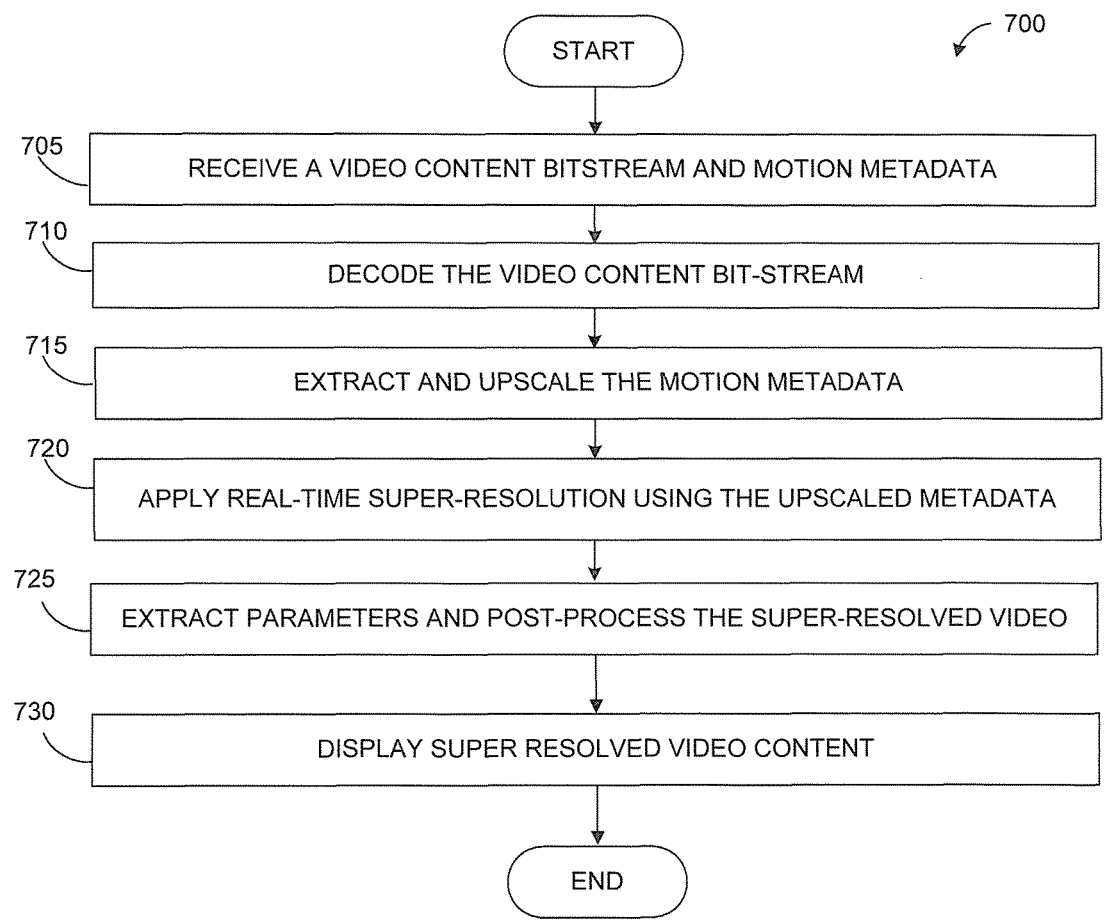
FIG. 7 is a flow diagram illustrating an example method according to this disclosure.

FIG. 7 illustrates a process for real-time multi-frame super resolution 700 according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a mobile device or television.

At step 705, a terminal, such as a television or a mobile device, receives a bitstream. The bitstream includes an encoded video and motion metadata which includes motion information and parameters (such as downsampling parameters). The motion metadata is extracted from the video before downsampling and encoding. The motion metadata is then downsampled over consecutive blocks before transmission. In an embodiment, the motion metadata is optical-flow (OF) metadata. The average of the motion metadata of the plurality of blocks assumes that motion is fixed over the plurality of blocks. Furthermore, the motion metadata for the plurality of blocks of the frame of video content is used in the upsampling process to combine each frame with a few neighboring frames.

At step 710, the terminal decodes the bitstream of the video content. The motion metadata for the plurality of blocks can have been previously estimated from the video content before the video content is encoded and transmitted as a bitstream.

The terminal extracts and upscales the motion metadata for the plurality of blocks in step 715. Upsampling can be done using any upsampling method such as nearest-neighbor interpolation.

At step 720, the terminal applies real-time super-resolution using the upscaled motion metadata. For example, the terminal upscales the decoded video with the help of upscaled motion metadata using any of the Equations (11)-(13) and then deblurs and denoises the video using Equation (15).

At step 725, the terminal extracts parameters from the metadata and post-processes the super-resolved video to apply some enhancements.

At step 730, the terminal displays the super-resolved video content. The super-resolved video content has a higher resolution than the transmitted video content.

Although various features have been shown in the figures and described above, various changes may be made to the figures. For example, the size, shape, arrangement, and layout of components shown in FIGS. 1 through 3 and 6 are for illustration only. Each component could have any suitable size, shape, and dimensions, and multiple components could have any suitable arrangement and layout. Also, various components in FIGS. 1 through 3 and 6 could be combined, further subdivided, or omitted and additional components could be added according to particular needs. Further, each component in a device or system could be implemented using any suitable structure(s) for performing the described function(s). In addition, while FIG. 7 illustrates various series of steps, various steps in FIG. 7 could overlap, occur in parallel, occur multiple times, or occur in a different order.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of increasing resolution using a real-time super-resolution (SR) technique, the method comprising:
  receiving a bitstream including an encoded video sequence and metadata, wherein the metadata includes motion metadata for a plurality of blocks of a frame of video content and processing parameters, wherein the motion metadata is estimated from an original video before downsampling and encoding and wherein the motion metadata is downsampled by averaging over consecutive blocks;
  upscaling the motion metadata for the plurality of blocks;
  decoding the encoded video sequence;
  upscaling the decoded video with help of upscaled motion metadata; and
  deblurring and denoising the upscaled video.

2. The method of claim 1, further comprising after upscaling the motion metadata and after upscaling, deblurring, and denoising the video, applying post-processing to the video.

3. A method of increasing resolution using a real-time super-resolution (SR) technique, the method comprising:
  receiving a bitstream including an encoded video sequence and metadata, wherein the metadata includes motion metadata for a plurality of blocks of a frame of video content and processing parameters, wherein the motion metadata is estimated from an original video before downsampling and encoding, and wherein the motion metadata is downsampled by averaging over consecutive blocks;
  upscaling the motion metadata for the plurality of blocks;
  decoding the encoded video sequence; and
  upscaling the decoded video using the upscaled motion metadata.

4. The method of claim 3, wherein the motion metadata is optical-flow (OF) motion.

5. The method of claim 4, wherein the OF motion is averaged over consecutive blocks before being embedded into the video bitstream as metadata.

6. The method of claim 3, wherein each decoded video frame is upscaled and combined with a few neighboring frames within a temporal window with help of motion metadata.

7. The method of claim 3, further comprising deblurring and denoising the upscaled video.

8. The method of claim 3, further after upscaling the motion metadata and the video, applying post processing to the video for further enhancements to generate super-resolved video content.

9. The method of claim 8, wherein the super-resolved video content has a higher resolution than the encoded video sequence.

10. A super-resolution (SR) processor for real-time super resolution of video content, the super-resolution processor configured to:
  receive a decoded video sequence and motion metadata for a plurality of blocks of a frame of video content, wherein the motion metadata is extracted from the video before encoding and downsampling, and wherein the motion metadata is averaged over consecutive blocks;
  upscale the motion metadata for the plurality of blocks; and
  implement a real-time super-resolution technique comprising upscaling the decoded video using the upscaled motion metadata and subsequently deblurring and denoising the upscaled video.

11. The super-resolution processor of claim 10, wherein the SR processor is further configured to apply post-processing to the video after upscaling the motion metadata and after upscaling, deblurring, and denoising the video.

12. A super-resolution (SR) processor for real-time super resolution of video content, the super-resolution processor configured to:
  receive a decoded video sequence and motion metadata for a plurality of blocks of a frame of video content, wherein the motion metadata is extracted from the video before encoding and downsampling, and wherein the motion metadata is averaged over consecutive blocks;
  upscale the motion metadata for the plurality of blocks;
  implement a real-time super-resolution technique comprising upscaling the decoded video using the upscaled motion metadata.

13. The super-resolution processor of claim 12, wherein the motion metadata is optical-flow (OF) motion extracted from an original video before downsampling and encoding.

14. The super-resolution processor of claim 12, wherein the downsampled motion metadata assumes that motion is fixed over the plurality of blocks.

15. The super-resolution processor of claim 12, wherein each decoded video frame is combined with a few neighboring frames within a temporal window with help of motion metadata.

16. The super-resolution processor of claim 12, wherein the SR processor is further configured to deblur and denoise the upscaled video.

17. The super-resolution processor of claim 12, the SR processor is further configured to after upscaling the motion metadata and the video, apply post processing to the video for further enhancements to generate super-resolved video content.

18. An apparatus comprising the super-resolution processor of claim 12, wherein the apparatus further comprises a display screen configured to display super-resolution video content.

19. An apparatus comprising the super-resolution processor of claim 18, wherein the SR video content has a higher resolution than the decoded video sequence.

20. A system for real-time super resolution (SR) of video content, the system comprising:
a first device configured to:
  transmit a bitstream including an encoded video sequence and metadata, wherein metadata includes motion metadata for a plurality of blocks of a frame of video content and parameters, wherein the motion metadata is estimated from an original video before downsampling and encoding, wherein the motion metadata is downsampled over consecutive blocks before embedding into the bitstream, and wherein the downsampled motion metadata of the plurality of blocks assumes that motion is almost fixed within each block; and
a second device configured to:
  receive the bitstream including the encoded video sequence, the motion metadata for the plurality of blocks of a frame of video content, and the parameters,
  upscale the motion metadata for the plurality of blocks,
  decode the encoded video sequence, and
  upscale the decoded video using the motion metadata for the plurality of blocks.

\* \* \* \* \*